US010567338B2

(12) United States Patent
Ryu et al.

(10) Patent No.: US 10,567,338 B2
(45) Date of Patent: Feb. 18, 2020

(54) METHOD AND APPARATUS FOR SETTING UP RELAY LINK IN WIRELESS COMMUNICATION SYSTEM

(71) Applicants: Samsung Electronics Co., Ltd, Suwon-si (KR); Research & Business Foundation Sungkyunkwan University, Suwon-si (KR)

(72) Inventors: Hyunseok Ryu, Yongin-si (KR); Min-Young Chung, Seoul (KR); Ja-Heon Gu, Suwon-si (KR); Seung-Hoon Park, Seoul (KR); Won-Jin Lee, Changwon-si (KR); Min Jang, Seongnam-si (KR); Wonjun Hwang, Suwon-si (KR)

(73) Assignees: Samsung Electronics Co., Ltd., Suwon-si (KR); Research & Business Foundation Sungkyunkwan University, Suwon-si (KR)

( * ) Notice: Subject to any disclaimer, the term of this patent is extended or adjusted under 35 U.S.C. 154(b) by 0 days.

(21) Appl. No.: 15/780,081

(22) PCT Filed: Nov. 22, 2016

(86) PCT No.: PCT/KR2016/013450
§ 371 (c)(1),
(2) Date: May 30, 2018

(87) PCT Pub. No.: WO2017/095053
PCT Pub. Date: Jun. 8, 2017

(65) Prior Publication Data
US 2018/0351907 A1 Dec. 6, 2018

(30) Foreign Application Priority Data
Nov. 30, 2015 (KR) .................. 10-2015-0169021

(51) Int. Cl.
*H04W 24/02* (2009.01)
*H04L 29/12* (2006.01)
(Continued)

(52) U.S. Cl.
CPC ...... *H04L 61/2046* (2013.01); *H04L 61/2015* (2013.01); *H04W 76/10* (2018.02);
(Continued)

(58) Field of Classification Search
CPC ....... H04W 24/02; H04W 8/24; H04W 40/22; H04W 88/04; H04W 4/005; H04W 8/26;
(Continued)

(56) References Cited

U.S. PATENT DOCUMENTS

2011/0063995 A1* 3/2011 Chen ................ H04L 29/12028
370/254
2013/0039201 A1* 2/2013 Kwon .................... H04L 45/22
370/252
(Continued)

FOREIGN PATENT DOCUMENTS

KR 2002-0091872 A 12/2002
KR 10-2014-0105300 A 9/2014

OTHER PUBLICATIONS

International Search Report dated Mar. 3, 2017 in connection with International Patent Application No. PCT/KR2016/013450.
(Continued)

*Primary Examiner* — Jung Liu

(57) ABSTRACT

The present disclosure relates to a pre-$5^{th}$-Generation (5G) or 5G communication system to be provided for supporting higher data rates beyond $4^{th}$-Generation (4G) communication system such as Long Term Evolution (LTE). According to an embodiment of the disclosure, in a wireless communication system, a remote terminal transmits a relay request message to a target relay terminal. The remote terminal
(Continued)

performs an IP allocation procedure with the target relay terminal. The remote terminal performs relay communication with the target relay terminal on the basis of the IP allocation procedure. The IP allocation procedure is performed using an IP address which has been used in previous relay communication with a source relay terminal.

15 Claims, 15 Drawing Sheets

(51) Int. Cl.
| | |
|---|---|
| *H04W 76/10* | (2018.01) |
| *H04W 76/20* | (2018.01) |
| *H04W 76/14* | (2018.01) |
| *H04W 8/26* | (2009.01) |
| *H04W 88/04* | (2009.01) |
| *H04W 8/24* | (2009.01) |

(52) U.S. Cl.
CPC ........... *H04W 76/14* (2018.02); *H04W 76/20* (2018.02); *H04W 8/24* (2013.01); *H04W 8/26* (2013.01); *H04W 88/04* (2013.01)

(58) Field of Classification Search
CPC ...... H04W 4/70; H04W 76/14; H04B 7/2606; H04L 61/2046; H04L 61/2007; H04L 61/103; H04L 61/2092
See application file for complete search history.

(56) References Cited

U.S. PATENT DOCUMENTS

| | | | | |
|---|---|---|---|---|
| 2014/0127991 | A1* | 5/2014 | Lim ..................... | H04W 76/14 |
| | | | | 455/39 |
| 2015/0195863 | A1* | 7/2015 | Reznik ............. | H04W 28/0215 |
| | | | | 370/228 |
| 2015/0334757 | A1* | 11/2015 | Seo ..................... | H04W 24/08 |
| | | | | 370/329 |
| 2016/0127309 | A1* | 5/2016 | Yun ......................... | H04W 4/70 |
| | | | | 709/245 |
| 2018/0027429 | A1* | 1/2018 | Li ......................... | H04W 40/22 |
| | | | | 455/426.1 |

OTHER PUBLICATIONS

Written Opinion of the International Searching Authority dated Mar. 3, 2017 in connection with International Patent Application No. PCT/KR2016/013450.
"3rd Generation Partnership Project; Technical Specification Group Services and System Aspects; Study on extended architecture support for proximity-based services (Release 13)", 3GPP TR 23.713 V1.6.0, Sep. 2015, 80 pages.
"3rd Generation Partnership Project; Technical Specification Group Services and System Aspects; Service requirements for the Evolved Packet System (EPS)(Release 13)", 3GPP TS 22.278 V13.2.0, Dec. 2014, 46 pages.
"3rd Generation Partnership Project; Technical Specification Group Radio Access Network; Evolved Universal Terrestrial Radio Access (E-UTRA); Radio Resource Control (RRC); Protocol specification (Release 12)", 3GPP TS 36.331 V12.5.0, Mar. 2015, 445 pages.
R. Droms, "Dynamic Host Configuration Protocol", Network Working Group, Mar. 1997, 45 pages.
C. Perkins, Ed., "IP Mobility Support for IPv4, Revised", Internet Engineering Task Force (IETF), Nov. 2010, 100 pages.
C. Perkins, Ed., et al. "IP Mobility Support", Network Working Group, Oct. 1996, 79 pages.
C. Perkins, Ed., et al. "Mobile IPv4 Challenge/Response Extensions (Revised)", Network Working Group, Jan. 2007, 26 pages.
R. Koodli, Ed., "Mobile IPv6 Fast Handovers", Network Working Group, Jun. 2008, 48 pages.
C. Perkins, Ed., et al. "Mobility Support in IPv6", Internet Engineering Task Force (IETF), Jul. 2011, 169 pages.
S. Gundavelli, Ed., et al. "Proxy Mobile IPv6", Network Working Group, Aug. 2008, 92 pages.

* cited by examiner

METHOD AND APPARATUS FOR SETTING UP RELAY LINK IN WIRELESS COMMUNICATION SYSTEM

CROSS-REFERENCE TO RELATED APPLICATIONS AND CLAIM OF PRIORITY

This application is a 371 of International Application No. PCT/KR2016/013450 filed on Nov. 22, 2016, which claims priority to Korean Patent Application No. KR 10-2015-0169021 filed on Nov. 30, 2015, the disclosures of which are herein incorporated by reference in their entireties.

BACKGROUND

1. Field

The disclosure relates to a wireless communication system for supporting device-to-device communication, and more particularly, relates to a method and apparatus for managing a relay link between terminals.

2. Description of Related Art

To meet the demand for wireless data traffic having increased since deployment of 4th generation (4G) communication systems, efforts have been made to develop an improved 5th generation (5G) or pre-5G communication system. Therefore, the 5G or pre-5G communication system is also called a 'Beyond 4G Network' or a 'Post Long Term Evolution (LTE) System'.

The 5G communication system is considered to be implemented in higher frequency (mmWave) bands, e.g., 28 GHz or 60 GHz bands, so as to accomplish higher data rates. To decrease propagation loss of the radio waves and increase the transmission distance, the beamforming, massive multiple-input multiple-output (MIMO), Full Dimensional MIMO (FD-MIMO), array antenna, an analog beam forming, large scale antenna techniques are discussed in 5G communication systems.

In addition, in 5G communication systems, development for system network improvement is under way based on advanced small cells, cloud Radio Access Networks (RANs), ultra-dense networks, device-to-device (D2D) communication, wireless backhaul, moving network, cooperative communication, Coordinated Multi-Points (CoMP), reception-end interference cancellation and the like.

In the 5G system, Hybrid FSK and QAM Modulation (FQAM) and sliding window superposition coding (SWSC) as an advanced coding modulation (ACM), and filter bank multi carrier (FBMC), non-orthogonal multiple access (NOMA), and sparse code multiple access (SCMA) as an advanced access technology have been developed.

In a device-to-device (D2D) communication based cellular system, terminals (user equipments (UEs)) located within a communication support area of a base station perform cellular communication through communication support of the corresponding base station. But, in a public safety environment such as an earthquake, a fire, etc., some base stations cannot perform functions, and a terminal located in adjacent with the corresponding base station cannot perform normal cellular communication. To support the cellular communication of this remote terminal (or remote UE), a relay terminal (or relay UE) located within a communication support area of the base station provides a UE-to-network relay service for the remote terminal. Through the relay service that the relay UE provides, the remote UE is available for the cellular communication. But, unlike a base station-to-UE link, in a D2D link, two nodes can all have mobility, so a terminal-to-terminal D2D relay link change occurs frequently.

The service requirement for a 3rd generation partnership project (3GPP) technical specification (TS) 22.378 evolved packet system (EPS) is requiring the guarantee of the continuity of a relay communication service. However, there is a problem that, due to the mobility of the terminal, the remote UE fails to maintain the continuity of connection in a process of link change with the relay UE.

SUMMARY

An embodiment provides an apparatus and method for preventing a packet loss at device-to-device (D2D) relay link change in a wireless communication system.

Another embodiment provides an apparatus and method for reducing a time required at D2D relay link change in a wireless communication system.

A further embodiment provides an apparatus and method for simplified Internet Protocol (IP) address allocation at D2D relay link change in a wireless communication system.

A yet another embodiment provides an apparatus and method for providing, by a remote terminal, its own link change information to a previous relay terminal at D2D relay link change in a wireless communication system.

A still another embodiment provides an apparatus and method for binding update of preventing a packet loss of a remote terminal at D2D relay link change in a wireless communication system.

A method for operating a remote terminal in a wireless communication system according to an embodiment of the disclosure may include transmitting a link change information (LCI) message to a source relay terminal, transmitting a relay request message to a target relay terminal, performing an IP allocation procedure with the target relay terminal, and performing relay communication with the target relay terminal based on the IP allocation procedure, and the IP allocation procedure may be performed using an IP address used for previous relay communication with the source relay terminal.

A method for operating a source relay terminal in a wireless communication system according to another embodiment of the disclosure receiving an LCI message from a remote terminal, and transmitting a Device-to-Device Link Change Assistance (DLCA) message to a base station in response to reception of the LCI message, and the DLCA message may include an IP address that the source relay terminal has allocated to the remote terminal.

A method for operating a base station in a wireless communication system according to a further embodiment of the disclosure includes receiving a DLCA message from a source relay terminal, performing the binding update with a target relay terminal by using the DLCA message, and in response to the binding update being completed, transmitting a link change assistance (LCA) message to the target relay terminal, and the DLCA message and the LCA message may include an IP address that the source relay terminal has allocated to the remote terminal.

A method for operating a target relay terminal in a wireless communication system according to a still another embodiment of the disclosure includes receiving a relay request message from a remote terminal, receiving a message including an IP address of the remote terminal from a base station or the remote terminal, performing an IP duplication check by using the IP address of the remote terminal, allocating the remote terminal an IP address according to a result of the IP duplication check, and providing relay communication with the remote terminal by using the IP address, and the IP duplication check may be performed through a comparison between the IP used for previous relay communication with the source relay terminal included in the message received from the base station or the remote terminal and an IP address that the target relay terminal has previously allocated to another terminal.

A remote terminal according to a still another embodiment of the disclosure includes a transmitter and/or receiver configured to transmit an LCI message to a source relay terminal, transmit a relay request message to a target relay terminal, and receive an allocation identification message for an IP allocation procedure from the target relay terminal, and a control unit configured to perform an IP allocation procedure with the target relay terminal, and the IP allocation procedure is performed using an IP address used for previous relay communication with the source relay terminal.

A source relay terminal according to a still another embodiment of the disclosure includes a transmitter and/or receiver configured to receive an LCI message from a remote terminal, and transmit a DLCA message to a base station in response to reception of the LCI message. The DLCA message may include an IP address that the source relay terminal has allocated to the remote terminal.

A base station according to a still another embodiment of the disclosure includes a transmitter and/or receiver configured to receive a DLCA message from a source relay terminal, and transmit an LCA message to a target relay terminal, and a control unit configured to perform binding update by using the DLCA message. The DLCA message and the LCA message may include an IP address that the source relay terminal has allocated to the remote terminal.

A target relay terminal according to a still another embodiment of the disclosure includes a transmitter and/or receiver configured to receive a relay request message from a remote terminal, and receive a message including an IP address of the remote terminal from a base station or the remote terminal, and a control unit configured to perform an IP duplication check by using the IP address of the remote terminal, and allocate the remote terminal an IP address according to a result of the IP duplication check. The transmitter and/or receiver is further configured to provide relay communication with the remote terminal by using the allocated IP address, and the IP duplication check is performed through a comparison between an IP used for previous relay communication with the source relay terminal included in the LCA message and an IP address that the target relay terminal has previously allocated to another terminal.

Provided is an apparatus and method for efficient device-to-device (D2D) relay link change in a wireless communication system.

DETAILED DESCRIPTION

The operation principle of various embodiments is described below in detail with reference to the accompanying drawings. In describing various embodiments below, related well-known functions or constructions are not described in detail since they would obscure the gist of the invention in unnecessary detail. And, the terms described below, terms defined considering functions in various embodiments, may be modified in accordance with user and operator's intention, practice, etc. Therefore, the definition should be given on the basis of the content throughout the present specification.

Below, the disclosure explains a technology for relay link change in a wireless communication system.

The term denoting control information used in the following description, the term denoting network entities, the term denoting messages, the term denoting a component of a device, etc are illustrated For description convenience's sake. Accordingly, the disclosure is not limited to the terms described later, and may use other terms having equivalent technological meanings.

For description convenience's sake below, the terms and names defined in the 3rd generation partnership project long term evolution (3GPP LTE) standard may be partly used. However, the disclosure is not limited by the terms and names, and may be identically applied even to systems of other standards.

Figure 1:
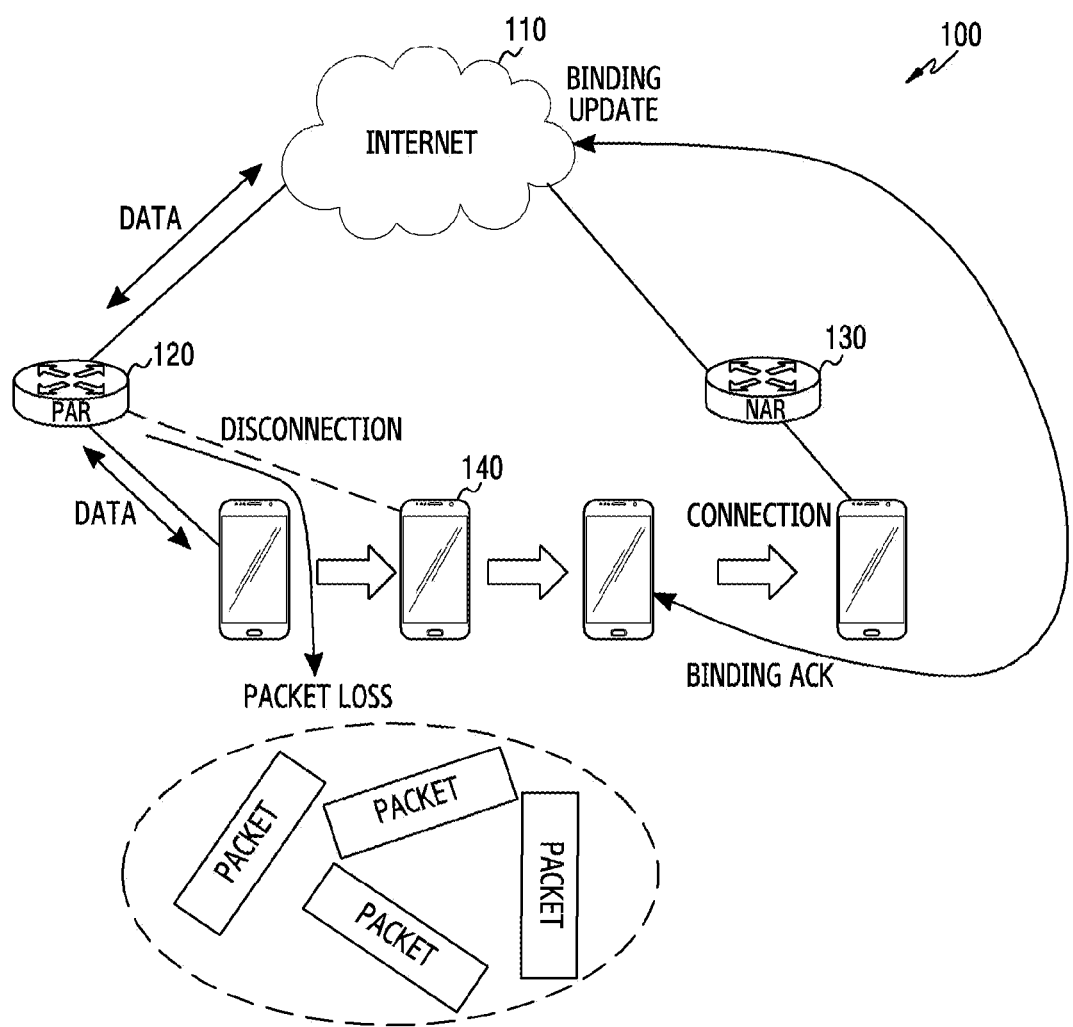
FIG. 1 illustrates a network environment of a basic protocol for link change of a mobile terminal in a wireless communication system.

FIG. 1 illustrates a network environment 100 of a basic protocol for link change of a mobile terminal in a wireless communication system.

The network environment 100 illustrated in FIG. 1 is a network environment for a basic protocol which is used to guarantee mobility at link change of a mobile terminal. A terminal 140 illustrated in FIG. 1, which is an electronic device having mobility, may communicate with a previous access router (PAR) 120 or a new access router (NAR) 130 through a wireless network. The PAR 120 or NAR 130, an example of a router, may relay between the terminal 140 having mobility and an Internet network 110. To communicate with the Internet network 110, the terminal 140 may transmit data to the PAR 120 or the NAR 130 or receive data from the PAR 120 or the NAR 130.

A general mobile IP technology supports the mobility of the terminal 140 in the network environment 100 of FIG. 1. According to the general mobile IP technology, in response to handover occurring due to the mobility in the terminal 140 receiving a communication service of the PAR 120, the terminal 140 disconnects a communication link with the PAR 120 and connects to the NAR 130. After the existing communication link with the PAR 120 is released, the terminal 140 of the conventional mobile IP searches a new server located near the terminal 140, and the terminal 140 connects to the corresponding server and then performs binding update (BU) for changing a data link with the terminal 140. In response to the BU being performed, the Internet network 110 may transmit a binding acknowledgement (ACK) message to the terminal 140. After performing the BU, the terminal 140 may transmit data through the NAR 130 or receive data from the NAR 130. In accordance with an embodiment, this process may be denoted as break-before-make.

The link change of the conventional mobile IP connects to the new server after releasing the connection with the existing server, so a packet loss may take place in the link change process of the mobile terminal. Also, there may be a problem in which a long delay time is required until NAR connection after the releasing of the connection with the PAR 120.

Figure 2:
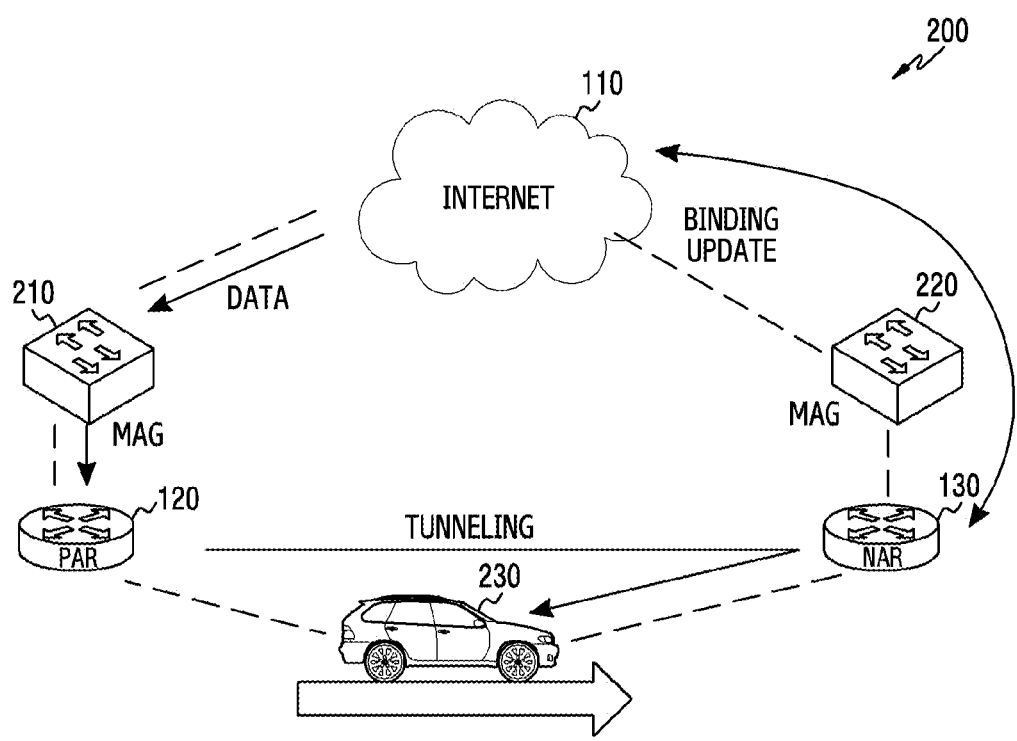
FIG. 2 illustrates a network environment of a client based protocol for link change of a mobile terminal in a wireless communication system.

FIG. 2 illustrates a network environment 200 of a client based protocol for link change of a mobile terminal in a wireless communication system. The protocol for the network environment 200 illustrated in FIG. 2 may be denoted as a fast mobile IP (FMIP).

According to the FMIP, tunneling between the PAR 120 and the NAR 130 may prevent a packet loss of the mobile terminal 230 that may be provided during the link change process. Through scanning, the terminal 230 may discover the NAR 130 for link change, and may acquire information about the NAR 130 from the NAR 130. The terminal 230 transmits the acquired information about the NAR 130 to the PAR 120, and a network control unit or a mobility access gateway (MAG) 210 or 220 provides the tunneling between the PAR 120 and the NAR 130 from the information about the NAR 130, and the PAR 120 transmits a packet, which will be transmitted to the terminal 230, to the NAR 130, thereby preventing the packet loss of the terminal 230. Also, in response to the terminal 230 succeeding in connection with the NAR 130, the NAR 130 may perform binding update with the Internet network 110, to change a data link of a packet. In the binding update, to forward a packet which will be transmitted to the terminal 230 to the mobile terminal 230 without a loss after link change or handover, a router such as the NAR 130 after link change stores the packet that will be transmitted to the mobile terminal 230 and, in response to the link change being completed, transmits the packet to the mobile terminal 230.

Figure 3:
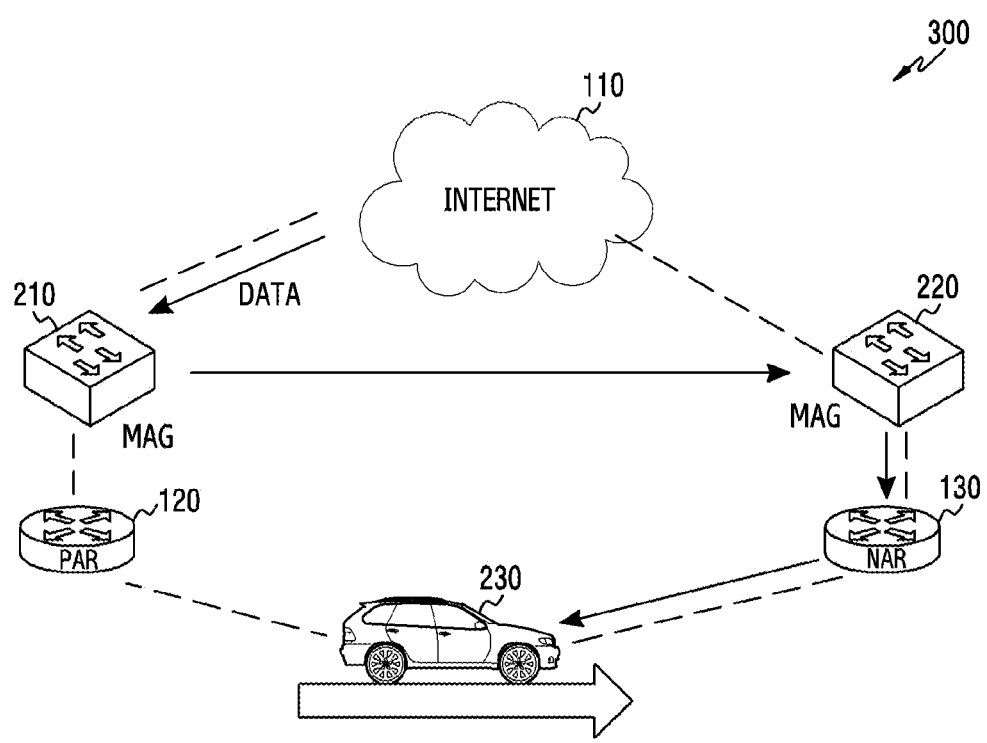
FIG. 3 illustrates a network environment of a network based protocol for link change of a mobile terminal in a wireless communication system.

FIG. 3 illustrates a network environment 300 of a network based protocol for link change of a mobile terminal in a wireless communication system. The protocol for the network environment 300 illustrated in FIG. 3 may be denoted as a proxy mobile IP (PMIP).

According to the PMIP, the management of mobility of the terminal 230 may be performed through a network by using the network based mobility protocol. Unlike the FMIP essentially needing a function of the management of the mobility of the terminal 230, the PMIP requires no signaling for the management of the mobility of the terminal 230. A mobility access gateway (MAG) 210 or 220 of the network performs the tracking of the moving terminal 230, whereby the MAG 210 or 220 transmits a packet to the PAR 120 even after handover of the terminal 230 occurs as in FIG. 3. The PAR 120 receiving this may again transmit the corresponding packet to the NAR 130.

In D2D relay communication, unlike the existing server supporting a wired link, a relay terminal providing the management of mobility of a remote terminal and a service in D2D relay communication configures a wireless link between the relay terminals. Also, a capacity of the relay terminal capable of receiving data is less compared to the server. Therefore, the D2D relay communication may have a problem in which stability is deteriorated compared to a general cellular communication that uses a wired network or base station. Also, the existing PAR and NAR have a different range of a managed subnet IP but, because the D2D relay communication uses the same subnet IP, there is a possibility of causing a phenomenon of being duplicated with an IP that is being used in the NAR.

Figure 4:
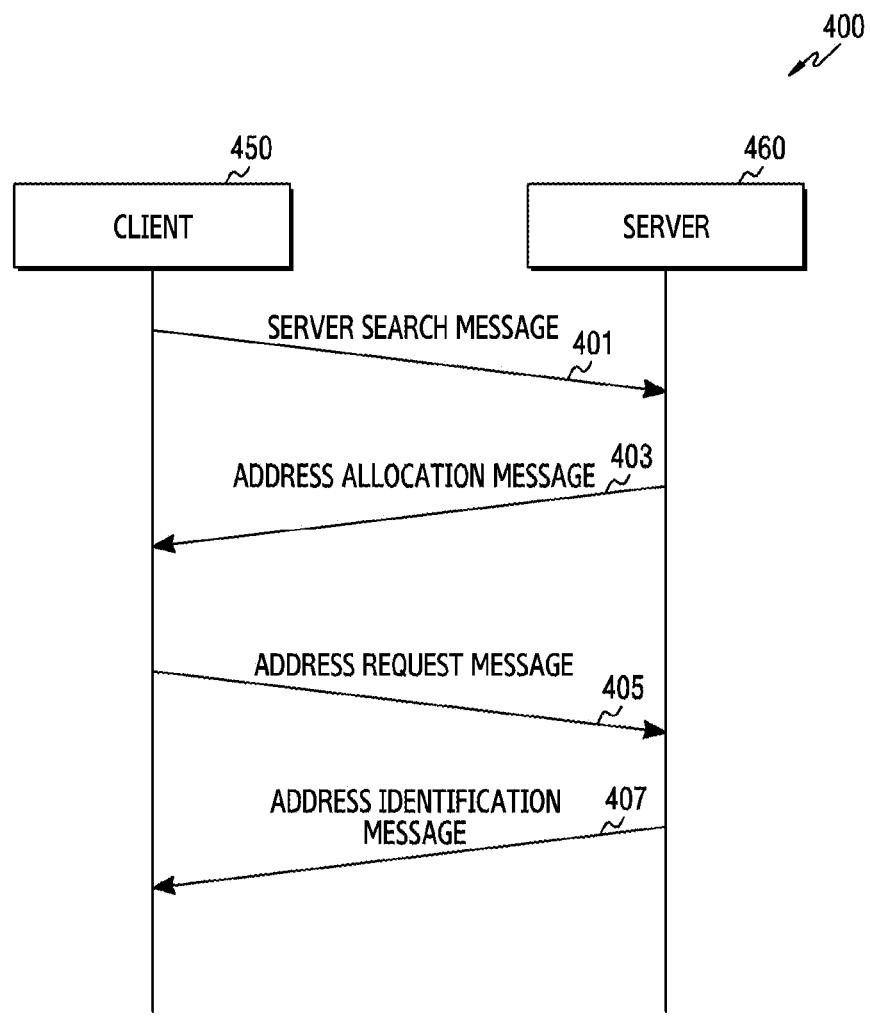
FIG. 4 illustrates a procedure of IP address allocation between a client and a server in a wireless communication system.

FIG. 4 illustrates an IP address allocation procedure 400 between a client and a server in a wireless communication system. A process of allocating an IP address to the client 450 in the server 460 coupled to the communication network such as an Internet network by using a dynamic host configuration protocol (DHCP) scheme is described below with reference to FIG. 4.

The client 450 requests for an allocation of an IP address, and performs communication with another network entity by using the allocated IP address. The client 450, an entity allocated an IP address and performing communication, may be a device such as a personal computer, a portable phone, a smartphone, and a tablet PC. The server 460, an entity allocating an IP address to the client 450, may be commonly an entity of a network such as a DHCP server or be a terminal in the D2D relay communication.

An IP allocation procedure for the client 450 is given as follows. In step 401, the client 450 connects to a communication network, and transmits a server search message for searching a suitable server to a plurality of servers. The server search message is a message for searching, by the client 450, a server, and may be denoted as a discovery message. At this time, the client 450 may include a medium access control (MAC) address being its own unique identification number in the server search message, and transmit the server search message including the MAC address.

In response to the server search message from the client 450, in step 403, the server 460 desiring IP address allocation transmits an address allocation message including an assignable IP address, to the client 450, to notify the client 150 that the server 460 is a server allocating the IP address. In accordance with an embodiment, the address allocation message is a message of notifying that some server may allocate an IP address, and may be denoted as an Offer message. Herein, the server desiring the IP address allocation may be one or more in number.

In step 405, the client 450 receiving the address allocation message may select an IP address desired to be allocated and thereafter, provide an address request message of requesting an allocation of the selected IP address and transmit the same to the server 460. The address request message is a message of requesting the allocation of the IP address selected by the client 450, and may be denoted as a Request message.

In step 407, the server 460 selected by the client 450, that is, the server 460 which has transmitted the address allocation message including the IP address selected by the client 450 may transmit, to the client 450, an address identification message of notifying that the corresponding IP address has been allocated. That is, the address identification message is transmitted only from the server 460 which has allocated the IP address selected by the client 450. The address identification message is a message of identifying that the IP address has been allocated to the client 450, and may be denoted as an Acknowledge message.

Figure 5:
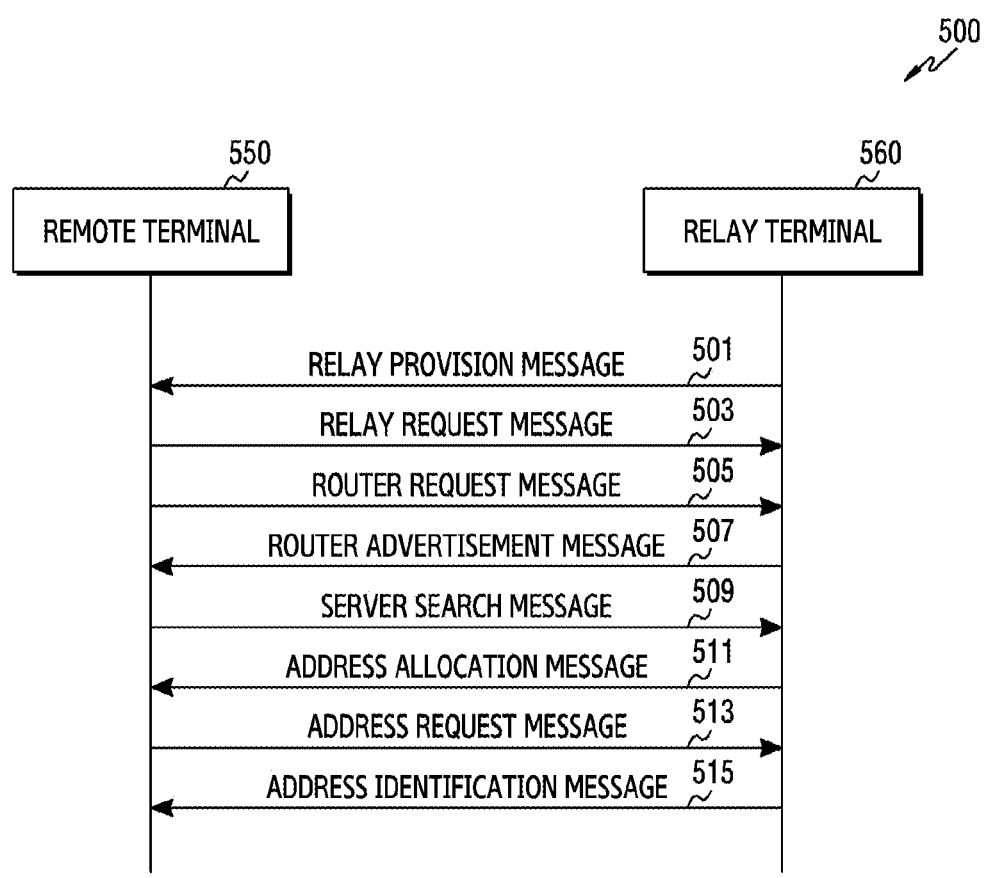
FIG. 5 illustrates a connection procedure for D2D relay communication in a wireless communication system.

FIG. 5 illustrates a connection procedure for D2D relay communication in a wireless communication system.

In step 501, a relay terminal 560 broadcasts a relay provision message. The relay provision message is a message of notifying that the relay terminal 560 may provide relay communication, and may be denoted as an Announcement message. In response to the relay communication being needed, in step 503, a remote terminal 550 transmits a relay request message to the relay terminal 560. The relay request message is a message of making, by the remote terminal 550, a relay communication request to a terminal capable of providing relay communication, and may be denoted as a Direct Communication Request message. Thereafter, in step 505, the remote terminal 550 transmits a router request message to the relay terminal 560, to request for information about a router required for the relay communication. The router request message is a message of requesting, by the remote terminal 550, a router required for communication, and may be denoted as a Router Solicitation message. In step 507, the relay terminal 560 receiving the router request message transmits a router advertisement message to the remote terminal 550, to proceed with a connection procedure such as router allocation. The router advertisement message is an advertisement message including information about the router required for the relay communication, and may be denoted as a Router Advertisement message.

In step 509, the remote terminal 550 connects to a communication network, to transmit a server search message for searching a suitable server, to the relay terminal 560. The server search message is a message for searching, by a terminal, a server in a network that uses a DHCPv4 protocol, and may be denoted as a DHCPv4 Discovery message.

In response to the server search message from the remote terminal 550, in step 511, the relay terminal 560 transmits an address allocation message including an assignable IP address to the remote terminal 550. The address allocation message is a message of notifying that some server may allocate an IP address, and may be denoted as a DHCPv4 Offer message. The message is message of notifying the remote terminal 550 that the relay terminal 560 is a terminal allocating an IP address.

In step 513, after selecting an IP address desired to be allocated, the remote terminal 550 receiving the address allocation message may provide an address request message of requesting an allocation of the selected IP address and transmit the same to the relay terminal 560. The address request message may be denoted as a DHCPv4 Request.

In step 515, the relay terminal 560 transmitting the address allocation message including the IP address selected by the remote terminal 550 and receiving the address request message may forward an address allocation identification message of notifying that the corresponding IP address has been allocated to the remote terminal 550. The address identification message may be denoted as a DHCPv4 Acknowledge.

For the purpose of establishing and changing of a terminal-to-terminal D2D relay link, data transmission may be needed maximum eight times as in FIG. 5. The D2D relay link terminal has to transmit signals four times for the sake of one-time signaling. In response to a distance between terminals getting distant due to the mobility of the terminal, the terminal-to-terminal D2D relay link gets more unstable and accordingly to this, a change of the D2D relay link may occur frequently.

Figure 6:
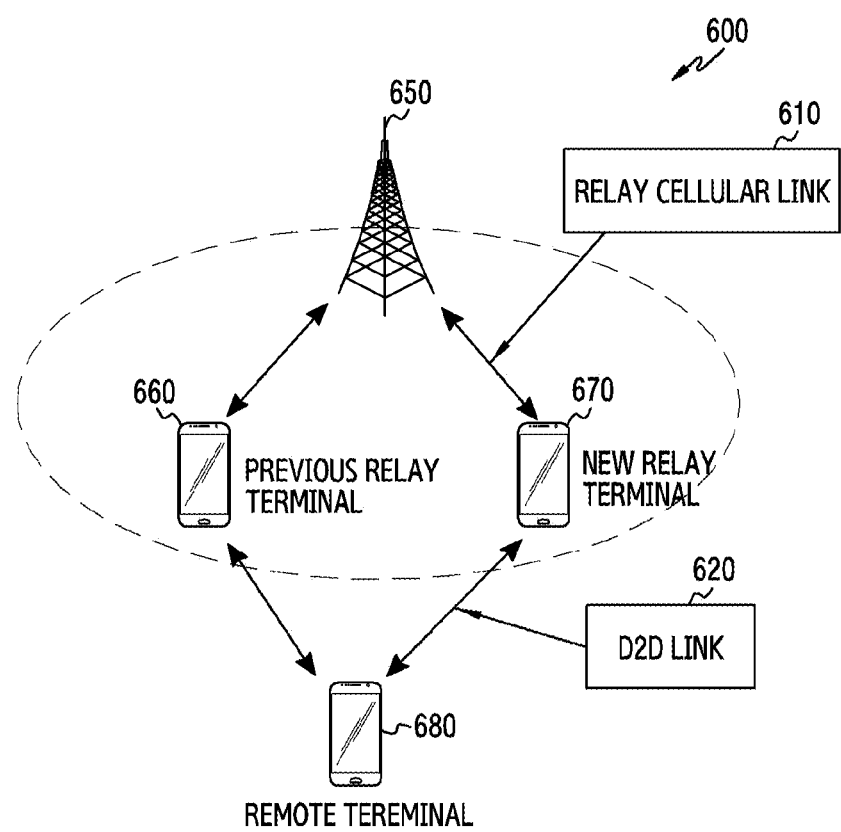
FIG. 6 illustrates a network environment supporting D2D communication in a wireless communication system according to an embodiment.

FIG. 6 illustrates a network environment 600 supporting D2D communication in a wireless communication system according to an embodiment. For an operation description of the disclosure according to an embodiment, FIG. 6 exemplifies an environment in which a remote terminal 680 is unavailable to communicate with a base station (eNB) 650, and relay terminals 660 and 670 are available to communicate with the base station 650 and provide a D2D relay service to the remote terminal 680. The base station 650 may be denoted as a node B (NB) and/or an enhanced node B (eNB). Also, a previous relay UE refers a relay terminal which provides the existing relay service at the time of occurrence of a change of a D2D communication link of the remote terminal 680, and a new relay UE refers a relay terminal which provides a D2D relay service to the remote terminal 680 after the link change. The previous relay terminal may be denoted as a source relay terminal. The new relay terminal may be denoted as a target relay terminal.

The network environment 600 of FIG. 6 may include the base station 650, the remote terminal 680, the previous relay terminal 660 having ever provided the relay link to the remote terminal 680 before the relay link change, and the new relay terminal 670 providing the relay link to the remote terminal 680 after the relay link change.

In the conventional cellular system, terminals located within a communication support area, i.e., coverage of a base station may perform cellular communication through a communication support of the corresponding base station. But, in a public safety environment such as an earthquake, a fire, etc., some base stations fail to perform functions, and a terminal such as the remote terminal 680 located in adjacent with the corresponding base station may not perform normal cellular communication. To support this cellular communication of the remote terminal 680, the previous relay terminal 660 and the new relay terminal 670 located within the communication support area of the base station provide the remote terminal 680 with a relay service between the remote terminal 680 and the base station 650. The remote terminal 680 is available to perform cellular communication through the relay service.

Figure 7:
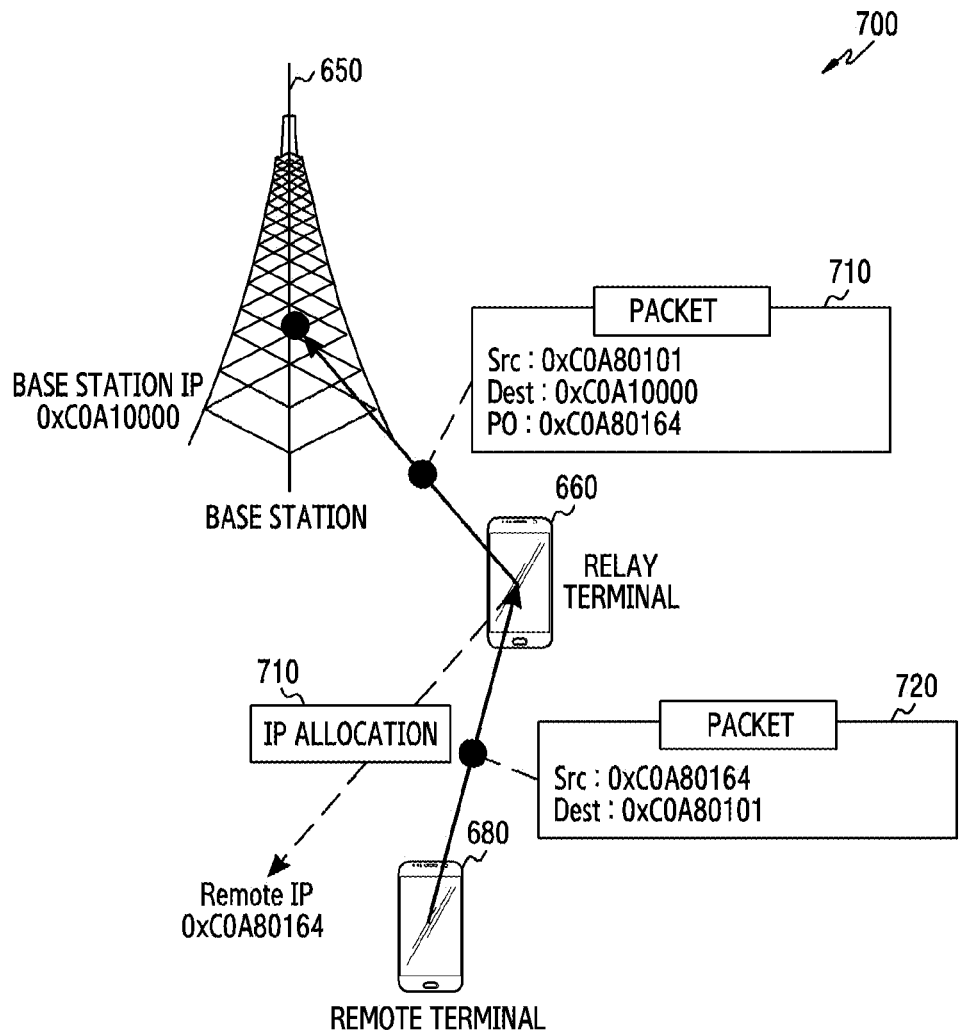
FIG. 7 illustrates an example of an IP address used at packet transmission in a wireless communication system according to an embodiment.

FIG. 7 illustrates an example of an IP address used at packet transmission in a wireless communication system according to an embodiment. For description convenience's sake, FIG. 7 illustrates a procedure of IP address allocation among the base station 650, the previous relay terminal 660 and the remote terminal 680 but, instead of the previous relay terminal 660, the new relay terminal 670 may be included.

According to an embodiment, the remote terminal 680 and the previous relay terminal 660 may be given an IP address of IPv6 or IPv4 in an initial connection procedure. Herein, a local IP address available only between the previous relay terminal 660 and the remote terminal 680 may be allocated. That is, even though the previous relay terminal 660 and the remote terminal 680 externally use the same IP, a corresponding IP may be internally used only between the previous relay terminal 660 and the remote terminal 680. For example, a range of the IP address may be 192.16.80.0 to 192.168.255.255.

In response to the previous relay terminal 660 relaying data to the base station 650, the previous relay terminal 660 may transmit the data to the base station 650 after converting a source IP into its own IP. In this case, the previous relay terminal 660 may map an IP of the remote terminal 680 having requested for a relay of corresponding data, to an ID of a specific port, and record the mapped IP.

In response to the previous relay terminal 660 receiving data about the specific port from the base station 650, the previous relay terminal 660 designates an IP of the remote terminal 680 mapped to a corresponding port, as a destination IP, and makes a data relay available.

Figure 8:
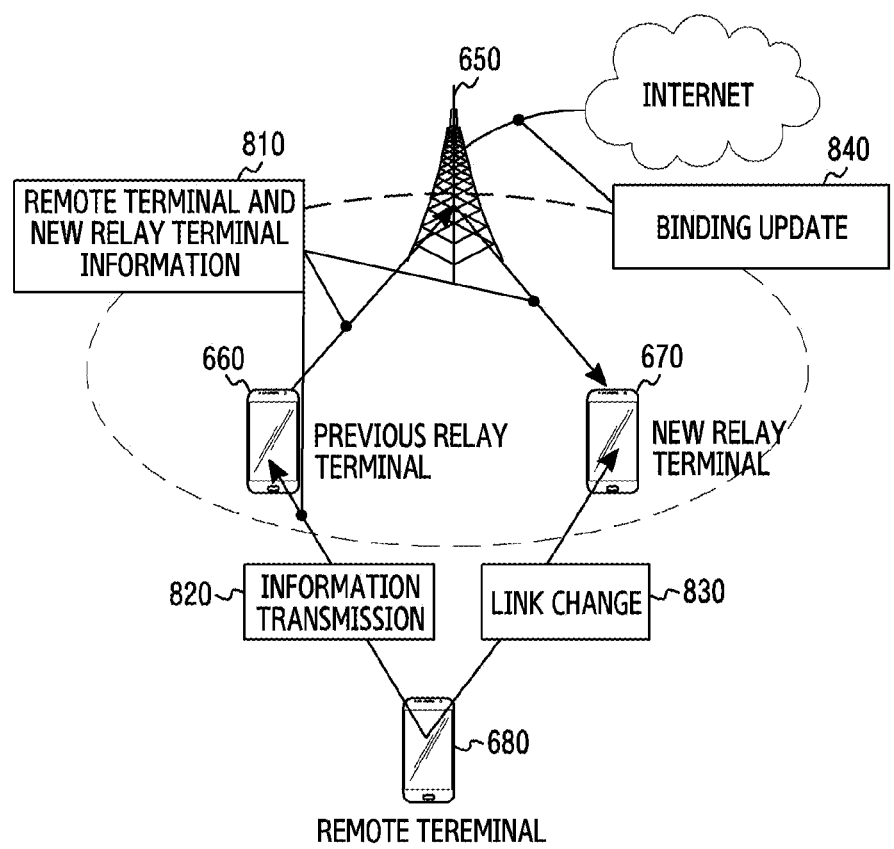
FIG. 8 illustrates a network environment for relay link change in a wireless communication system according to an embodiment.

FIG. 8 illustrates a network environment for relay link change in a wireless communication system according to an embodiment.

The network environment 800 of FIG. 8 may include the base station 650, the remote terminal 680, the previous relay terminal 660 having ever provided a relay link to the remote terminal 680 before relay link change, and the new relay terminal 670 providing a relay link to the remote terminal 680 after the relay link change.

According to an embodiment, a procedure for changing the relay link of the remote terminal 680 from the previous relay terminal 660 to the new relay terminal 670 is performed. In changing the relay link, the remote terminal 680 may transmit link change information to the previous relay terminal 660 (820), and the previous relay terminal 660 receiving a message including the link change information may transmit the message including the information for link change to the base station 650. The base station 650 receiving the information required for the link change from the previous relay terminal 660 may transmit information 810 of the remote terminal 680 to the new relay terminal 670, and may assist link change 830 by transmitting the information 810 of the remote terminal 680 to the new relay terminal 670.

According to an embodiment, the remote terminal 680 may transmit a link change information (LCI) message to the previous relay terminal 660. The LCI message is a message of notifying a relay link change to the previous relay terminal 660, and may include information of the remote terminal 680 and the new relay terminal 670 for link change of the remote terminal 680. For example, the LCI message may include a ProSe UE ID of the remote terminal 680, an IP address of the remote terminal 680, and ProSe UE ID information of the new relay terminal 670.

According to an embodiment, the previous relay terminal 660 receiving the LCI message may transmit a D2D link change assistance (DLCA) message to the base station 650. The DLCA message may include information for binding update 840 of the remote terminal 680. For example, the DLCA message may include a ProSe UE ID of the remote terminal 680, an IP address of the remote terminal 680, and a ProSe Relay UE ID of the new relay terminal 670. By transmitting the DLCA message to the base station 650, the previous relay terminal 660 may move up a binding update time of the remote terminal 680, to prevent a packet loss.

According to an embodiment, the base station 650 receiving the DLCA message may transmit a link change assistance (LCA) message for IP address allocation to the new relay terminal 670. The new relay terminal 670 and the remote terminal 680 may simplify a link change procedure between the new relay terminal 670 and the remote terminal 680 by using the LCA message transmitted from the base station 650 to the new relay terminal 670. The LCA message may include information about a ProSe UE ID of the remote terminal 680 and an IP address that the remote terminal 680 is using. By transmitting the LCA message to the new relay terminal 670, the base station 650 may provide the new relay terminal 670 with information necessary for a link change procedure between the new relay terminal 670 and the remote terminal 680. By receiving the LCA message and acquiring the information necessary for the link change procedure, the new relay terminal 670 may omit a part of a procedure of IP allocation to the remote terminal 680. The aforementioned previous relay terminal 660 may be denoted as a previous relay UE or a P_RUE. The new relay terminal 670 may be denoted as a new relay UE or an N_RUE. The base station 650 may be denoted as an enhanced NodeB, an eNodeB (eNB), or the like.

Figure 9:
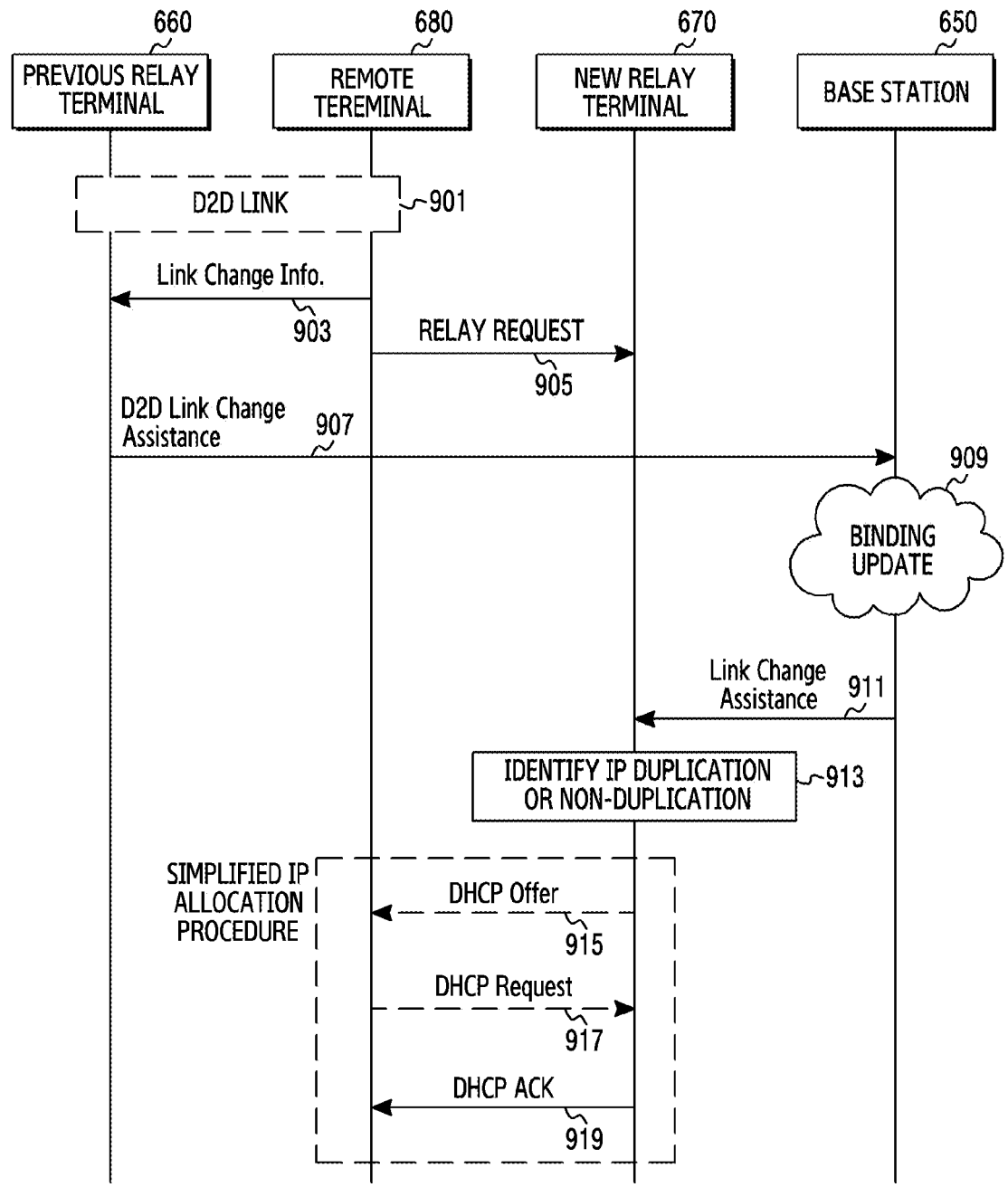
FIG. 9 illustrates a procedure for relay link change in a wireless communication system according to an embodiment.

FIG. 9 illustrates a message flow procedure for relay link change in a wireless communication system according to an embodiment. This message flow may occur in the base station 650, the previous relay terminal 660, the new relay terminal 670, and the remote terminal 680 illustrated in FIG. 6.

Referring to FIG. 9, in step 901, a D2D link is established between the remote terminal 680 and the previous relay terminal 660. In step 901, the previous relay terminal 660 may receive a scheduling assignment (SA) message of the remote terminal 680 to which self is providing a D2D relay service, to selectively relay data of the corresponding remote terminal 680. The SA message may include a ProSe UE ID of the remote terminal 680 which self takes charge of the relay service, an IP address of the remote terminal 680, and a message destination address. For example, the message destination address may include a ProSe Relay UE ID of the new relay terminal 670 from which the remote terminal 680 intends to receive the relay service.

The SA message may be transmitted together with data or separately. The SA message may include scheduling information and/or control information such as resource allocation information.

In step 903, in response to a link change request of the remote terminal 680 occurring, the remote terminal 680 may transmit a link change information (LCI) message to the previous relay terminal 660. In an embodiment, the remote terminal 680 in which the link change request has occurred receives a relay announcement message from the new relay terminal 670, to determine a target relay terminal for link change and transmit the LCI message to the previous relay terminal 660. The LCI message is a message of notifying a relay link change to the previous relay terminal 660, and may include link change information of the remote terminal 680. For example, the LCI message may include a ProSE UE ID of the remote terminal 680, an IP address of the remote terminal 680, and a ProSe Relay UE ID of the new relay terminal 670.

In step 905, the remote terminal 680 may select a relay terminal from which it is intended to receive a relay service, based on a discovery signal transmitted by the relay terminal. Herein, the discovery signal transmitted by the relay terminal is a message that the relay terminal provides for the purpose of a D2D connection procedure. Owing to a change of an environment such as a mobility, etc. of the remote terminal 680 or the relay terminal such as the previous relay terminal 660, a D2D relay link change may take place according to a server search message of the relay terminal that the remote terminal 680 receives. In response to the requirement for the D2D relay link change being satisfied, the remote terminal 680 may transmit a relay request message to a new relay terminal that self has selected. Thereafter, the remote terminal 680 may perform a procedure for link change such as D2D link establishment, etc. with the new relay terminal 670.

In response to the remote terminal 680 receiving the D2D relay service of the previous relay terminal 660 selecting the new relay terminal such as the new relay terminal 670 and transmitting a relay request message to the new relay terminal for the purpose of link change, the previous relay terminal 660 may sense a link change attempt of the remote terminal 680 through reception of an LCI message received from the remote terminal 680. For example, the LCI message may include a ProSe UE ID of the remote terminal 680, an IP address of the remote terminal 680, and ProSe UE ID information of the new relay terminal 670. The previous relay terminal 680 may acquire information of the new relay terminal 670 included from the LCI message.

In step 907, the previous relay terminal 660 obtaining the link change attempt of the remote terminal 680 transmits a D2D link change assistance (DLCA) message to the base station 650. The DLCA message may include information for binding update of the remote terminal 680. For example, the DLCA message may include a ProSe UE ID of the remote terminal 680, an IP address of the remote terminal 680, and ProSe Relay UE ID of the new relay terminal 670. By transmitting the DLCA message to the base station 650, the previous relay terminal 660 may move up a binding update time of the remote terminal 680, to prevent a packet loss.

In step 909, the base station 650 receiving the DLCA message from the previous relay terminal 660 may perform the binding update by using the DLCA message, to prevent a packet loss of the remote terminal 680 which may occur in the link change process. In the binding update process, the base station 650 transmits or forwards data being transmitted to the remote terminal 680, to the new relay terminal 670, at relay link change, and thus the new relay terminal 670 may store this data. Or, the base station 650 may store data being transmitted to the remote terminal 680 in a storage unit of the base station 650, at relay link change, and transmit the same to the new relay terminal 670.

In step 911, the base station 650 may transmit a link change assistance (LCA) message to the new relay terminal 670. The LCA message may include information about the ProSe UE ID of the remote terminal 680 and the IP address that the remote terminal is using. By transmitting the LCA message to the new relay terminal 670, the base station 650 may provide information necessary for a link change procedure between the new relay terminal 670 and the remote terminal 680. By receiving the LCA message and acquiring the information necessary for the link change procedure, the new relay terminal 670 may omit a part of a procedure of IP allocation to the remote terminal 680.

The new relay terminal 670 proceeds with a D2D link establishment procedure for a relay service of the remote terminal 680. Through an IP allocation procedure of the remote terminal 680 among the D2D relay link establishment procedure, the new relay terminal 670 may perform a necessary operation according to reception of an LCA message from the base station 650 or reception or non-reception of an address request message from the remote terminal 680.

In step 913, in response to the new relay terminal 670 receiving the LCA message from the base station 650 prior to IP allocation for the remote terminal 680, or in response to the new relay terminal 670 receiving the address request message from the remote terminal 680, the new relay terminal 670 may acquire an IP address that the remote terminal 680 has ever used at the time of relay communication with the previous relay terminal 660, by using the LCA message. The new relay terminal 670 may perform a duplication check between the acquired IP address and an IP address that the new relay terminal 670 has previously allocated to another remote terminal or an allocation IP pool.

In response to the new relay terminal 670 failing to receive the LCA message from the base station 650 prior to the IP allocation of the remote terminal 680 and failing to receive even the address request message from the remote terminal 680, the new relay terminal 670 provides a new IP for the remote terminal 680 and performs all of the existing same procedure. Also, by using the changed IP address, the new relay terminal 670 may request binding update of the remote terminal 680 to the base station 650.

In response to the duplication of the IP address being discovered, in step 915, the new relay terminal 670 transmits an address allocation message to the remote terminal 680, thereby providing an available IP to the remote terminal 680. In response to the new relay terminal 670 transmitting the address allocation message to the remote terminal 680, in step 917, the remote terminal 680 transmits an address request message to the new relay terminal 670, thereby requesting an allocation of a desired IP address. In step 919, the new relay terminal 670 receiving the address request message from the remote terminal 680 transmits an address identification message to the remote terminal 680, thereby identifying that it might use the corresponding IP address.

In response to the duplication of the IP address not being discovered, steps 915 and 917 are omitted and, in step 919, the new relay terminal 670 transmits the address identification message to the remote terminal 680. In detail, the new relay terminal 670 may terminate the IP allocation procedure by transmitting a message of using the same IP as the IP having been ever used in the relay communication with the previous relay terminal 660.

In response to a duplication with an IP acquired from an allocation IP pool of the new relay terminal 670 being discovered, the new relay terminal 670 may provide a new IP for the remote terminal 680 and perform all the IP allocation procedure. But, compared to IP address resources that the relay terminal such as the new relay terminal 670 is possessing, the number of the whole remote terminals connecting to self is very less, so a probability in which the IP duplication occurs in the IP pool of the new relay terminal 670 is very low.

Figure 10:
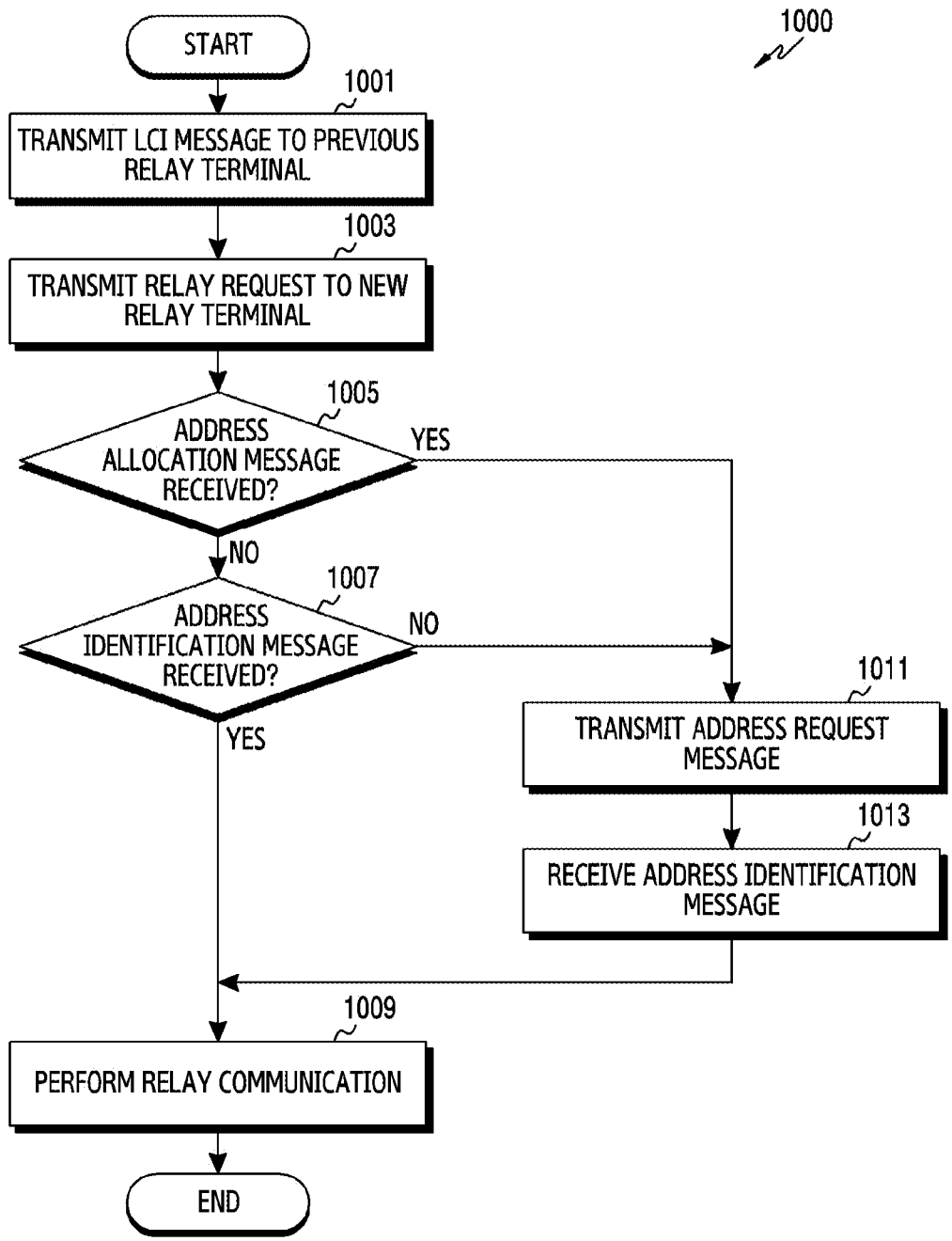
FIG. 10 illustrates a flowchart of a remote terminal (remote UE) at relay link change in a wireless communication system according to an embodiment.

FIG. 10 illustrates a flowchart 1000 of a remote terminal (remote UE) at relay link change in a wireless communication system according to an embodiment. These steps of FIG. 10 may include an operation of the remote terminal 680 illustrated in FIG. 6.

In step 1001, in response to a link change request of the remote terminal 680 taking place, the remote terminal 680 may transmit a link change information (LCI) message to the previous relay terminal 660. The LCI message may include a ProSe UE ID of the remote terminal 680, an IP address of the remote terminal 680, and a Prose Relay UE ID of the new relay terminal 670.

In step 1003, in response to the remote terminal 680 performing link change due to a mobility of the terminal, the remote terminal 680 may transmit a relay request message (D2D direct communication request) to the new relay terminal that self has selected. Thereafter, the remote terminal 680 may perform a link change procedure such as D2D link establishment, etc. with the new relay terminal 670.

In step 1005, the remote terminal 680 identifies whether an address allocation message (DHCP Offer) is received from the new relay terminal 670. The DHCP Offer message may include an IP address that the new relay terminal 670 may allocate.

In response to the address allocation message (DHCP Offer) not being received from the new relay terminal 670, in step 1007, the remote terminal 680 identifies whether an address allocation identification message (DHCP ACK) is received from the new relay terminal 670. By transmitting to the remote terminal 680 a message (DHCP ACK) of using the same IP as an IP having been ever used in relay communication with the previous relay terminal 660, the new relay terminal 670 may terminate an IP allocation procedure. That is, the remote terminal 680 receiving the DHCP ACK message may use the same IP address as an IP address, which has been ever used at the time of communicating with the previous relay terminal 660, for relay communication with the new relay terminal 670.

In response to the remote terminal 680 receiving the address allocation message from the new relay terminal 670, in step 1011, the remote terminal 680 may select an IP address desired to be allocated and thereafter, provide an address request message of requesting for an allocation of the selected IP address and transmit the same to the new relay terminal 670.

In response to the remote terminal 680 not receiving the address allocation message from the new relay terminal 670 while not receiving even the address identification message, in step 1011, the remote terminal 680 may select an IP address desired to be allocated and thereafter, provide an address request message of requesting for an allocation of the selected IP address and transmit the same to the new relay terminal 670.

In step 1013, the remote terminal 680 transmitting the address request message to the new relay terminal 670 receives an address identification message from the new relay terminal 670. It may be appreciated that the remote terminal 680 receiving the address identification message has been allocated an IP address for relay communication with the new relay terminal 670.

In step 1009, the remote terminal 680 performs D2D relay communication through the new relay terminal 670. That is, the remote terminal 680 is available for cellular communication through a relay service that the new relay terminal 670 provides.

Figure 11:
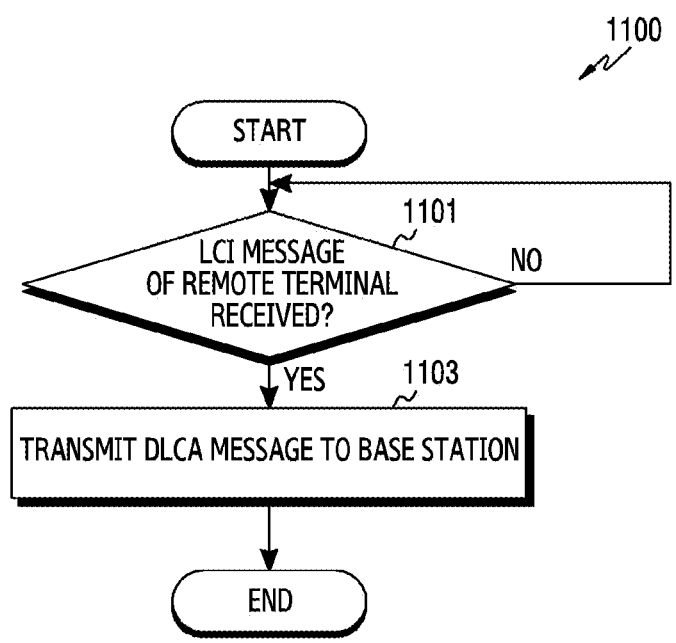
FIG. 11 illustrates a flowchart of a previous relay terminal (previous relay UE) at relay link change in a wireless communication system according to an embodiment.

FIG. 11 illustrates a flowchart 1100 of a previous relay terminal (previous relay UE) at relay link change in a wireless communication system according to an embodiment. Steps of FIG. 11 may include an operation of the previous relay terminal 660 illustrated in FIG. 6.

In step 1101, the previous relay terminal 660 may identify a relay link change of the remote terminal 680 through reception of an LCI message of the remote terminal 680 to which self is providing a D2D relay service. For example, the LCI message may include a ProSe UE ID of the remote terminal 680, an IP address of the remote terminal 680, and a ProSe Relay UE ID of a relay terminal from which it is intended to receive the relay service.

In step 1103, the previous relay terminal 660 identifying the link change attempt of the remote terminal 680 transmits a D2D link change assistance (DLCA) message to the base station 650. The DLCA message may include information for binding update of the remote terminal 680. For example, the DLCA message may include a proximity service (ProSe) UE ID of the remote terminal 680, an IP address of the remote terminal 680, and a ProSe Relay UE ID of the new relay terminal 670. By transmitting the DLCA message to the base station 650, the previous relay terminal 660 may move up a binding update time of the remote terminal 680, to prevent a packet loss.

Figure 12:
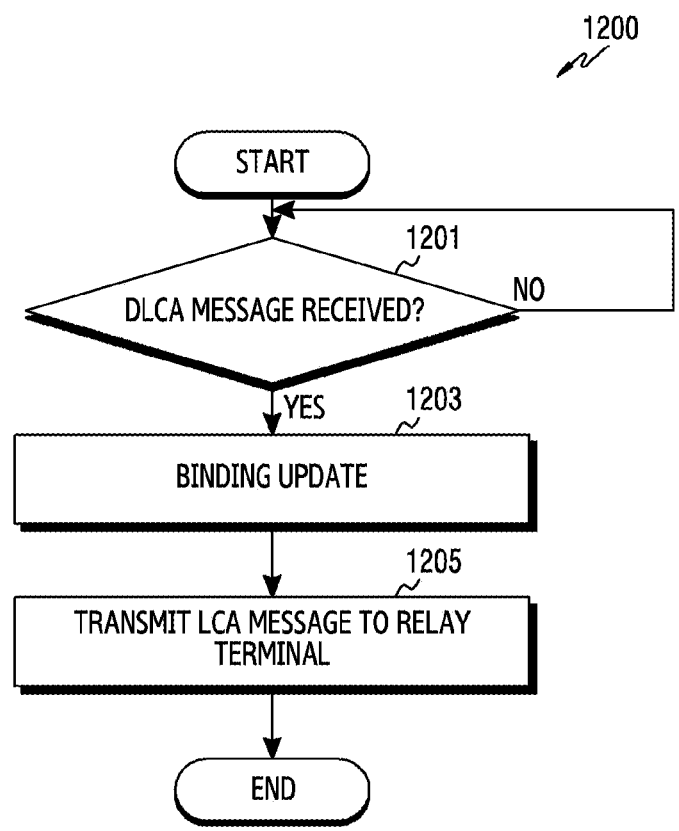
FIG. 12 illustrates a flowchart of a base station at relay link change in a wireless communication system according to an embodiment.

FIG. 12 illustrates a flowchart 1200 of a base station 650 at relay link change in a wireless communication system according to an embodiment. Steps of FIG. 12 may include an operation of the base station 650 illustrated in FIG. 6.

In step 1201, the base station 650 identifies whether a DLCA message is received from the previous relay terminal 660. The previous relay terminal 660 obtaining the link change attempt of the remote terminal 680 transmits a D2D link change assistance (DLCA) message to the base station 650. The DLCA message may include information for binding update of the remote terminal 680. For example, the DLCA message may include a proximity service (ProSe) UE ID of the remote terminal 680, an IP address of the remote terminal 680, and a ProSe Relay UE ID of the new relay terminal 680.

In response to the base station 650 receiving the DLCA message from the previous relay terminal 660, in step 1203, the base station 650 performs binding update for the remote terminal 680 in order to change a packed transmission path of the remote terminal 680. In this case, the base station 650 may move up a binding update time, to prevent a packet loss. In response to IP duplication occurring in the new relay terminal 670 and a newly provided IP being allocated to the remote terminal 680, the base station 650 again performs binding update for the newly provided IP.

In step 1205, the base station 650 transmits a link change assistance (LCA) message to the new relay terminal 670. The LCA message may include information about the ProSe UE ID of the remote terminal 680 and the IP address that the remote terminal 680 is using. By transmitting the LCA message to the new relay terminal 670, the base station 650 may provide information necessary for a link change procedure between the new relay terminal 670 and the remote terminal 680. By receiving the LCA message and acquiring the information necessary for the link change procedure, the new relay terminal 670 may omit a part of a procedure of IP allocation to the remote terminal 680.

Figure 13:
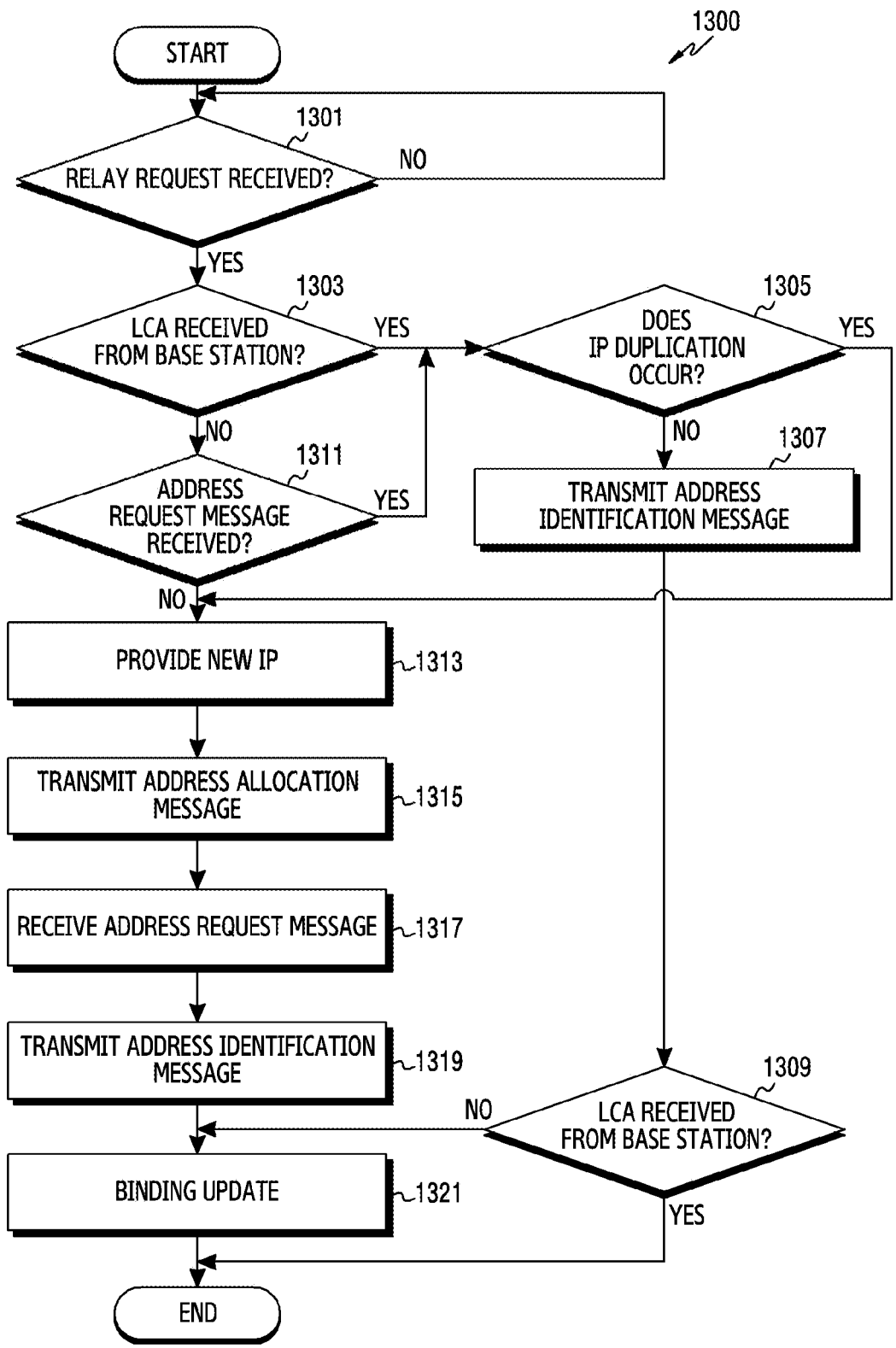
FIG. 13 illustrates a flowchart of a new relay terminal (new relay UE) at relay link change in a wireless communication system according to an embodiment.

FIG. 13 illustrates a flowchart 1300 of a new relay terminal (new relay UE) at relay link change in a wireless communication system according to an embodiment. Steps of FIG. 13 may include an operation of the new relay terminal 670 illustrated in FIG. 6.

In step 1301, the new relay terminal 670 identifies whether a relay request message is received from the remote terminal 680. In response to the relay request message being received, the new relay terminal 670 may identify that the remote terminal 680 intends to establish a relay link through the new relay terminal 670.

In response to the new relay terminal 670 receiving the relay request message from the remote terminal 680, in step 1303, the new relay terminal 670 identifies whether a LCA is received from the base station 650. The LCA message may include information about a ProSe UE ID of the remote terminal 680 and an IP address that the remote terminal 680 is using. By transmitting the LCA message to the new relay terminal 670, the base station 650 may provide information necessary for a link change procedure between the new relay terminal 670 and the remote UE 680.

In response to the new relay terminal 670 receiving the LCA from the base station 650, in step 1305, the new relay terminal 670 identifies whether IP duplication occurs. For example, the new relay terminal 670 may perform a duplication check between the acquired IP address and an IP address that the new relay terminal 670 has previously allocated to another remote UE 680 or an allocation IP pool.

In response to the IP duplication not occurring in step 1305, in step 1307, the new relay terminal 670 transmits an address identification message to the remote terminal 680. By transmitting to the remote terminal 680 the address identification message being a message of using the same IP as an IP that has been ever used for relay communication with the previous relay terminal 660, the new relay terminal 670 may terminate an IP allocation procedure.

In response to the new relay terminal 670 transmitting the address identification (DHCP ACK) message to the remote terminal 680, in step 1309, the new relay terminal 670 failing to receive the link change assistance (LCA) message from the base station 650 in step 1303 earlier than the duplication check may identify whether an LCA message is received from the base station 650.

In response to the new relay terminal 670 receiving the LCA message from the base station 650, the new relay terminal 670 may provide relay communication to the remote terminal 680 by using the LCA message. In response to the new relay terminal 670 failing to receive the LCA message from the base station 650, the new relay terminal 670 may separately perform binding update, to provide relay communication to the remote terminal 680. In response to IP duplication occurring in the new relay terminal 670 and thus a newly provided IP being allocated to the remote terminal 680, the base station 650 may again perform binding update for the newly provided IP.

In response to the new relay terminal 670 not receiving the LCA from the base station 650 in step 1303, in step 1311, the new relay terminal 670 identifies whether an address request message is received from the remote terminal 680. The remote terminal 680 may select an IP address having been ever used previously in relay communication with the previous relay terminal 660 and thereafter, provide an address request message of requesting an allocation of the selected IP address and transmit the same to the new relay terminal 670. In response to the new relay terminal 670 receiving the address request message from the remote terminal 680, in step 1305, the new relay terminal 670 performs an IP duplication check.

In response to the new relay terminal 670 not receiving the address request message from the remote terminal 680, in step 1313, the new relay terminal 670 provides an IP for providing relay communication to the remote terminal 680.

In step 1315, the new relay terminal 670 transmits an address allocation message to the remote terminal 680. The new relay terminal 670 transmits the address allocation message including an assignable IP address to the remote terminal 680, to notify the remote terminal 680 of allocating an IP address.

In step 1317, the new relay terminal 670 receives an address request message from the remote terminal 680. The remote terminal 680 receiving the address allocation message may select an IP address desired to be allocated and thereafter, provide the address request message of requesting for an allocation of the selected IP address and transmit the same to the new relay terminal 670.

In step 1319, the new relay terminal 670 transmits an address identification message to the remote terminal 680. The new relay terminal 670 may transmit to the remote terminal 680 the address identification message of notifying that the corresponding IP address has been allocated. That is, the new relay terminal 670 may transmit the IP address allocated to the remote terminal 680, to the remote terminal 680.

In step 1321, the new relay terminal 670 performs binding update. Through the binding update, the new relay terminal 670 may change a data link, to prevent a packet loss. In response to the IP duplication occurring in the new relay terminal 670 and thus the newly provided IP being allocated to the remote terminal 680, the base station 650 again performs the binding update for the newly provided IP. Herein, that the LCA is received is that the binding update is already performed, so there is not a need to perform the binding update separately.

Figure 14:
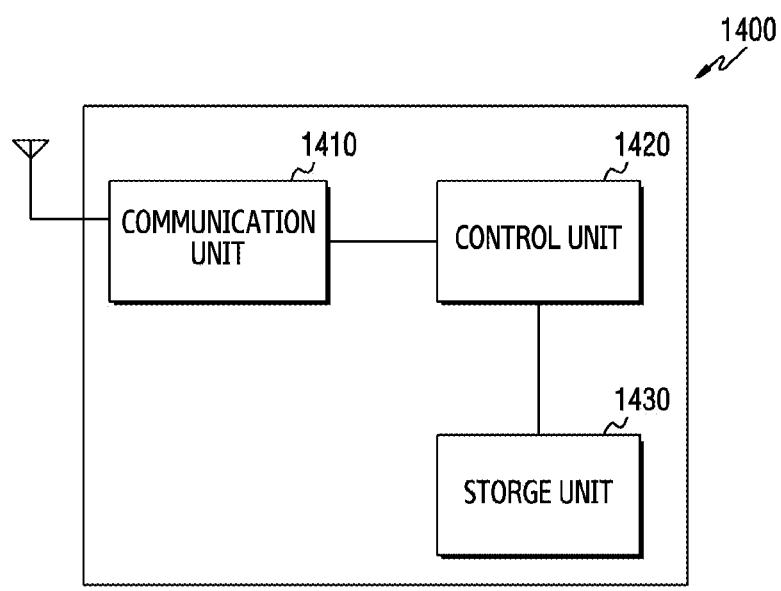
FIG. 14 illustrates a functional block construction of a terminal according to an embodiment.

FIG. 14 illustrates a functional block construction of a terminal 1400 according to an embodiment. The terminal 1400 may be the previous relay terminal 660, the new relay terminal 670, or the remote terminal 680 of FIG. 6. The terms ' . . . unit', ' . . . er', etc. used below represent the unit of processing at least one function or operation. This may be implemented as hardware, software, or a combination of hardware and software.

Referring to FIG. 14, the terminal 1400 includes a communication unit 1410, a control unit 1420, and a storage unit 1430.

The communication unit 1410 performs functions for receiving a signal through a wireless channel. The communication unit 1410 may include a transmission and/or reception unit for transmitting and receiving a signal. For example, the communication unit 1410 may perform reception of a radio frequency (RF) signal, frequency modulation, demodulation, decoding, cyclic prefix (CP) elimination, fast Fourier transform (FFT), channel estimation, equalizing, etc. The communication unit 1410 may additionally perform a function of transmitting a signal processed in the control unit 1420, to another node.

The transmission and/or reception unit included in the communication unit 1410 may transmit or receive a signal to a base station or another terminal. In accordance with an embodiment, a relay terminal capable of providing relay communication in D2D communication may provide relay communication to a terminal not capable of performing cellular communication with the base station.

The control unit 1420 controls general operations of the terminal. For example, the control unit 1420 receives a signal through the communication unit 1410. Also, the control unit 1420 records data in the storage unit 1430, and reads. For this, the control unit 1420 may include at least one processor, micro processor, or microcontroller, or may be a part of the processor.

The storage unit 1430 stores data such as a basic program for an operation of the terminal 1400, an application program, setting information, etc. For example, the storage unit 1430 performs functions for storing data processed in the control unit 1420. The storage unit 1430 may consist of a volatile memory, a non-volatile memory, or a combination of the volatile memory and the non-volatile memory. For example, the storage unit 1430 may include a random access memory (RAM), a flash memory, etc.

FIG. 14 illustrates that the terminal 1400 includes the communication 1410, the control unit 1420, and the storage unit 1430. In accordance with another embodiment, the terminal 1400 may further include an additional construction besides the aforementioned construction.

Figure 15:
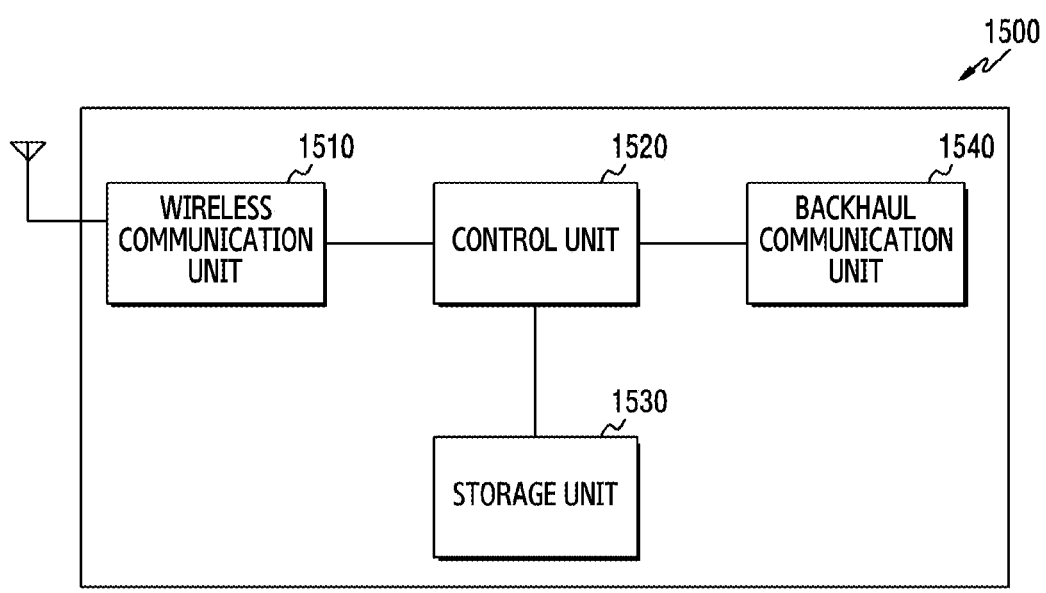
FIG. 15 illustrates a functional block construction of a base station according to an embodiment.

FIG. 15 illustrates a functional block construction of the base station 650 according to an embodiment.

The terms ' ... unit', ' ... er', etc. used below represent the unit of processing at least one function or operation. This may be implemented as hardware, software, or a combination of hardware and software.

Referring to FIG. 15, the base station 650 includes a wireless communication unit 1510, a control unit 1520, a storage unit 1530, and a backhaul communication unit 1540.

The wireless communication unit 1510 performs functions for receiving a signal through a wireless channel. The communication unit 1510 may include a transmission and/or reception unit for transmitting and receiving a signal. For example, the wireless communication unit 1510 may perform reception of a radio frequency (RF) signal, frequency modulation, demodulation, decoding, cyclic prefix (CP) elimination, fast Fourier transform (FFT), channel estimation, equalizing, etc. The wireless communication unit 1510 may additionally perform a function of transmitting a signal processed in the control unit 1520, to another node.

The control unit 1520 controls general operations of the base station 650. For example, the control unit 1520 receives a signal through the wireless communication unit 1510 or the backhaul communication unit 1540. Also, the control unit 1520 records data in the storage unit 1530, and reads. For this, the control unit 1530 may include at least one processor, micro processor, or microcontroller, or may be a part of the processor.

The storage unit 1530 stores data such as a basic program for an operation of the base station 650, an application program, setting information, etc. For example, the storage unit 1530 performs functions for storing data processed in the control unit 1520. The storage unit 1530 may consist of a volatile memory, a non-volatile memory, or a combination of the volatile memory and the non-volatile memory. For example, the storage unit 1530 may include a random access memory (RAM), a flash memory, etc.

The backhaul communication unit 1540 provides an interface for performing communication with other nodes within a network. That is, the backhaul communication unit 1540 converts a bit stream transmitted from the base station to another node, for example, another connection node, another base station, a core network, etc., into a physical signal, and converts a physical signal received from another node, into a bit stream.

FIG. 15 illustrates that the base station 650 includes the communication 1510, the control unit 1520, the storage unit 1530 and the backhaul communication unit 1540. In accordance with another embodiment, the base station 650 may further include an additional construction besides the aforementioned construction.

Methods according to embodiments mentioned in claims or specification of the disclosure may be implemented in the form of hardware, software, or a combination of the hardware and the software.

This software may be stored in a computer-readable storage medium. The computer-readable storage medium stores at least one program including instructions enabling an electronic device to execute a method of the disclosure when the instructions are executed by at least one processor in at least one program (software module) and/or the electronic device.

This software may be stored in the form of a volatile storage device or a non-volatile storage device such as a read only memory (ROM), or in the form of a memory such as a random access memory (RAM), a memory chip, or a device or integrated circuit, or an optical or magnetic readable medium such as a compact disc—ROM (CD-ROM), a digital versatile disc (DVD), a magnetic disc, a magnetic tape, etc.

The storage device and storage medium are embodiments of programs including instructions of implementing embodiments when executed, or a machine-readable storage means suitable for storing the programs. The embodiments provide a program including a code for implementing an apparatus or method as claimed in any one of claims of the specification, and a machine-readable storage medium storing such the program. Further, such the programs may be electronically forwarded by any medium such as a communication signal forwarded through wired or wireless connection, and the embodiments include an equivalent suitably.

A remote terminal according to various embodiments of the disclosure includes a transmitter and/or receiver configured to transmit an LCI message to a source relay terminal, transmit a relay request message to a target relay terminal, and receive an allocation identification message for an IP allocation procedure from the target relay terminal, and a control unit configured to perform relay communication with the target relay terminal, and the IP allocation procedure is performed using an IP address used for previous relay communication with the source relay terminal. Herein, the transmitter and/or receiver is configured to perform the relay communication with the target relay terminal by using the same IP address as the IP address used for the relay communication with the source relay terminal. Also, the message of notifying the relay link change includes a ProSe UE ID of the remote terminal, an IP address of the remote terminal, and a ProSe Relay UE ID of the target relay terminal.

A source relay terminal according to another embodiment of the disclosure includes a transmitter and/or receiver configured to receive an LCI message from a remote terminal, and transmit a DLCA message to a base station in response to reception of the LCI message. The DLCA message may include an IP address that the source relay terminal has allocated to the remote terminal. Also, the LCI message includes a ProSe UE ID of the remote terminal, an IP address of the remote terminal, and a ProSe Relay UE ID of the target relay terminal. Also, the LCI message may be transmitted in response to the relay terminal attempting the relay link change. Also, the DLCA message may include a ProSe UE ID of the remote terminal, an IP address of the remote terminal, and a ProSe Relay UE ID of the target terminal.

A base station according to a further embodiment of the disclosure includes a transmitter and/or receiver configured to receive a DLCA message from a source relay terminal, and transmit an LCA message to a target relay terminal, and a control unit configured to perform binding update by using the DLCA message. The DLCA message and the LCA message may include an IP address that the source relay terminal has allocated to the remote terminal. The DLCA message may include a ProSe UE ID of the remote terminal, an IP address of the remote terminal, and a ProSe Relay UE ID of the target terminal.

A target relay terminal according to a still another embodiment of the disclosure includes a transmitter and/or receiver configured to receive a relay request message from a remote terminal, and receive a message including an IP address of the remote terminal from a base station or the remote terminal, and a control unit configured to perform an IP duplication check by using the IP address of the remote terminal, and allocate the remote terminal an IP address according to a result of the IP duplication check. The transmitter and/or receiver is further configured to provide relay communication with the remote terminal by using the allocated IP address, and the IP duplication check is performed through a comparison between an IP used for previous relay communication with the source relay terminal included in the LCA message and an IP address that the target relay terminal has previously allocated to another terminal. The transmitter and/or receiver is configured to receive a message for IP address allocation from the base station, and the message for the IP address allocation may include a ProSe UE ID of the remote terminal and the IP address of the remote terminal. Also, the control unit may allocate the same IP address as an IP address used for relay communication with a source relay terminal, in response to IP duplication not occurring as a result of the IP duplication check. At this time, the transmitter and/or receiver may transmit an IP address identification (DHCP ACK) message to the relay terminal. Also, the control unit may allocate a new IP address to the remote terminal, in response to IP duplication occurring as a result of the IP duplication check. At this time, the transmitter and/or receiver may transmit an IP address allocation (DHCP Offer) message to the target relay terminal, and receive an IP address allocation request (DHCP Request) message from the target relay terminal, and transmit an IP address allocation identification (DCHP ACK) message to the target relay terminal. Also, the transmitter and/or receiver may receive an IP address allocation request (DHCP Request) message from the remote terminal.

In the aforementioned concrete embodiments, constituent elements included in the invention have been expressed in a singular form or plural form in accordance with a proposed concrete embodiment. But, the expression of the singular form or plural form is selected suitable to a proposed situation for description convenience. The aforementioned embodiments are not limited to singular or plural constituent elements and, despite a constituent element expressed in the plural form, it may be constructed in the singular form, or despite a constituent element expressed in the singular form, it may be constructed in the plural form.

While the invention has been described with reference to concrete embodiments, it is undoubted that various changes in form and details may be made without departing from the spirit and scope of various embodiments. Therefore, the scope of the disclosure should not be limited and defined by the described embodiment, and should be defined by claims described below and equivalents to these claims.

What is claimed is:

1. A method of operating a target relay terminal in a wireless communication system, the method comprising:
    receiving a relay request message from a remote terminal that is being performing relay communication with a source relay terminal through a first link;
    receiving, from a base station, a message for assisting a link change from the first link to a second link, the message comprising an internet protocol (IP) address of the remote terminal for the first link;
    performing an IP duplication check by using for identifying an IP duplication between the IP address of the remote terminal for the first link and an IP address of another remote terminal allocated by the target relay terminal, in response to receiving the message;
    transmitting, to the remote terminal, an address identification message for notifying an IP address of the remote terminal for the second link that is identical to the IP address of the remote terminal for the first link, in case that the IP duplication is not identified; and
    providing relay communication with the remote terminal by using the IP address for the second link,
    wherein the first link is established between the remote terminal and the source relay terminal, and
    wherein the second link is established between the remote terminal and the target relay terminal.

2. The method of claim 1, wherein receiving the message further comprises
    a proximity service (ProSe) user equipment (UE) identifier (ID) of the remote terminal.

3. The method of claim 1, further comprising:
    identifying that the message for assisting the link change from the first link to the second link is not received from the base station;
    receiving, from the remote terminal, an address request message for requesting an allocation of the IP address of the remote terminal the first link; and
    determining to perform the IP duplication check in response to receiving the address request message.

4. The method of claim 1, wherein the providing the relay communication with the remote terminal comprises:
    after transmitting the address identification message to the remote terminal, performing a binding update by receiving packets for the remote terminal from the base station; and
    transmitting, to the remote terminal, the packets by using the IP address for the second link,
    wherein the packets are stored in the base station through a binding updated performed by the base station before the message for assisting the link change is transmitted.

5. The method of claim 4, further comprising:
    in case that the IP duplication is identified,
    generating new IP address for the second link that are different from the IP address for the first link;
    transmitting, to the remote terminal, an address allocation message for providing the new IP addresses for the second link;
    receiving, from the remote terminal, an address request message comprising one of the new IP addresses determined by the remote terminal; and
    transmitting, to the remote terminal, an address identification message for notifying the IP address of the remote terminal for the second link that is the one of the new IP addresses.

6. The method of claim 5, wherein the transmitting the address identification message in case that the IP duplication is not identified comprises transmitting the address identification message for notifying the IP address for the second link that is identical to the IP address for the first link, without the address allocation message and the address request message.

7. A source relay terminal in a wireless communication system, the source relay terminal comprising:
    a transceiver; and
    at least one processor operably coupled to the transceiver,
    wherein the at least one processor is configured to:
        provide relay communication with a remote terminal by using an internet protocol (IP) address of the remote terminal for a first link,
        receive, from the remote terminal, a first message for notifying relay link change from the first link to a second link, and
        transmit, to a base station, a second message for assisting a link change from the first link to a second link in response to reception of the first message, wherein the second message comprises an internet protocol (IP) address of the remote terminal for the first link, wherein the first link is established between the remote terminal and the source relay terminal, wherein the second link is established between the remote terminal and a target relay terminal, and wherein packets for the remote terminal are stored in the base station through a binding update performed by the base station, in response reception of the second message by the base station.

8. The source relay terminal of claim 7, wherein the first message for notifying the relay link change further comprises a proximity service (ProSe) user equipment (UE) identifier (ID) of the remote terminal and a ProSe Relay UE ID of a target relay terminal.

9. The source relay terminal of claim 7, wherein the first message is transmitted in response to a remote terminal attempting the relay link change.

10. A target relay terminal in a wireless communication system, the target relay terminal comprising:
a transceiver; and
at least one processor operably coupled to the transceiver, wherein the at least one processor is configured to:
receive a relay request message from a remote terminal that is being performing relay communication with a source relay terminal through a first link,
receive, from a base station, a message for assisting a link change from the first link to a second link, the message comprising an internet protocol (IP) address of the remote terminal for the first link,
perform an IP duplication check for identifying an IP duplication between the IP address of the remote terminal for the first link and an IP address of another remote terminal allocated by the target relay terminal, in response to receiving the message,
transmitting, to the remote terminal, an address identification message for notifying an IP address of the remote terminal for the second link that is identical to the IP address of the remote terminal for the first link, in case that the IP duplication is not identified, and
provide relay communication with the remote terminal by using the IP address for the second link,
wherein the first link is established between the remote terminal and the source relay terminal, and
wherein the second link is established between the remote terminal and the target relay terminal.

11. The target relay terminal of claim 10, wherein the message further comprises a proximity service (ProSe) user equipment (UE) identifier (ID) of the remote terminal.

12. The target relay terminal of claim 10, wherein the at least one processor is further configured to:
identify that the message for assisting the link change from the first link to the second link is not received from the base station,
receive, from the remote terminal, an address request message for requesting an allocation of the IP address of the remote terminal for the first link, and
determine to perform the IP duplication check in response to receiving the address request message.

13. The target relay terminal of claim 10, wherein, in order to provide the relay communication with the remote terminal, the at least one processor is further configured to:
after transmitting the address identification message to the remote terminal, perform a binding update by receiving packets for the remote terminal from the base station, and
transmit, to the remote terminal, the packets by using the IP address for the second link,
wherein the packets are stored in the base station through a binding updated performed by the base station before the message for assisting the link change is transmitted.

14. The target relay terminal of claim 13, wherein the at least one processor is further configured to:
in case that the IP duplication is identified,
generate new IP address for the second link that are different from the IP address for the first link,
transmit, to the remote terminal, an address allocation message for providing the new IP addresses for the second link,
receive, from the remote terminal, an address request message comprising one of the new IP addresses determined by the remote terminal, and
transmit, to the remote terminal, an address identification message for notifying the IP address of the remote terminal for the second link that is the one of the new IP addresses.

15. The target relay terminal of claim 14, wherein, in order to transmit the address identification message in case that the IP duplication is not identified, the at least one processor is further configured to transmit the address identification message for notifying the IP address for the second link that is identical to the IP address for the first link, without the address allocation message and the address request message.

* * * * *